US012311823B2

(12) United States Patent
Synnott et al.

(10) Patent No.: US 12,311,823 B2
(45) Date of Patent: May 27, 2025

(54) TANK TRAILER WITH FLUID COLLECTION SYSTEM

(71) Applicant: TREMCAR INC., Saint-Jean-sur-Richelieu (CA)

(72) Inventors: Alexandre Synnott, Québec (CA); Pierre-Luc Beaudette, Saint-Basile-le-Grand (CA)

(73) Assignee: TREMCAR INC., Saint-Jean-sur-Richelieu (CA)

(*) Notice: Subject to any disclaimer, the term of this patent is extended or adjusted under 35 U.S.C. 154(b) by 833 days.

(21) Appl. No.: 17/552,084

(22) Filed: Dec. 15, 2021

(65) Prior Publication Data

US 2022/0194290 A1    Jun. 23, 2022

Related U.S. Application Data

(60) Provisional application No. 63/126,600, filed on Dec. 17, 2020.

(51) Int. Cl.
| | | |
|---|---|---|
| *B60P 3/22* | (2006.01) | |
| *B60S 1/64* | (2006.01) | |
| *B65D 90/10* | (2006.01) | |
| *B65D 90/34* | (2006.01) | |

(52) U.S. Cl.
CPC ........... *B60P 3/2265* (2013.01); *B60P 3/2235* (2013.01); *B60P 3/225* (2013.01); *B60P 3/2255* (2013.01); *B60P 3/226* (2013.01); *B60S 1/64* (2013.01); *B65D 90/10* (2013.01); *B65D 90/34* (2013.01)

(58) Field of Classification Search
CPC ......... B60P 3/225; B60P 3/226; B60P 3/2265; B60S 1/94; B65D 90/10; B65D 90/34
USPC ........................................................ 280/837
See application file for complete search history.

(56) References Cited

U.S. PATENT DOCUMENTS

| | | | | |
|---|---|---|---|---|
| 4,350,353 A | * | 9/1982 | van der Lely | ........ B60P 3/2205 |
| | | | | 220/501 |
| 9,834,128 B2 | | 12/2017 | Tremblay et al. | |
| 2018/0017214 A1 | * | 1/2018 | Hermiller | ................. B60P 3/22 |

* cited by examiner

*Primary Examiner* — Kevin Hurley
*Assistant Examiner* — Felicia L. Brittman-Alabi
(74) *Attorney, Agent, or Firm* — BakerHostetler (57) ABSTRACT

A tank trailer is provided. The tank trailer includes a tank having an interior volume adapted to contain fluid, and a manhole extending through the tank and positioned proximate a rear portion thereof and proximate to ground level. The tank trailer also includes a ventilation system having a ventilation interface communicating with the interior volume of the tank, a ventilation access port having a ventilation outlet positioned proximate the rear portion and proximate to ground level and a ventilation pipe adapted to establish fluid communication between the ventilation outlet and ventilation interface. The tank trailer further has a collection system which includes a collection pipe coupled between the ventilation interface and the ventilation pipe. The collection pipe defines an internal volume shaped and adapted to collect fluid spilling from the interior volume of the tank through the ventilation interface and at least partially prevent fluid flow into the ventilation pipe.

10 Claims, 11 Drawing Sheets

TANK TRAILER WITH FLUID COLLECTION SYSTEM

CROSS-REFERENCE TO RELATED APPLICATIONS

This application claims priority under 35 USC§ 119(e) of US Provisional Application No. 63/126,600, filed Dec. 17, 2020, entitled "TANK TRAILER WITH FLUID COLLECTION SYSTEM", the entirety of which is hereby incorporated by reference.

TECHNICAL FIELD

The technical field generally relates to tank trailers, and more particularly to tank trailers operable from a rear of the tank trailer and proximate to ground level.

BACKGROUND

Tankers built for sanitary applications are subject to strict quality codes. In order to comply to these codes, all the components of the tanker which comes in contact with lading must be cleaned thoroughly by a cleaning system integrated to the tanker itself. These tankers include a ventilation system which can be tedious to clean because filling the ventilation conduits with washing fluid can impede ventilation of the tanker, which can lead to structural issues.

To fill and unload the tanker, it is beneficial to evacuate the air initially trapped in the tanker, or to let the air in to replace the fluid being unloaded. Known ventilation systems exist to provide this need, however, fluid from within the tanker often spill into the vent lines of these ventilation systems. The vent lines would need to be washed similar to any other part of the tanker that comes in contact with the fluid within the tanker. The fluid from within the tanker can be prevented from spilling into the vent lines using a valve, although such valves would then need to be disassemble and washed.

In light of the above, there is a need for an improved tank trailer adapted for various operations, such as sanitary applications.

SUMMARY

According to a first aspect, a tank trailer is provided. The tank trailer includes a tank having an interior volume adapted to contain fluid. The tank includes a rear portion and a manhole extending through the tank and positioned proximate the rear portion and proximate to ground level. The tank trailer also includes a ventilation system having a ventilation interface communicating with the interior volume of the tank, a ventilation access port having a ventilation outlet positioned proximate the rear portion and proximate to ground level, and a ventilation pipe adapted to establish fluid communication between the ventilation outlet and ventilation interface. The tank trailer further includes a collection system including a collection pipe coupled between the ventilation interface and the ventilation pipe, the collection pipe defining an internal volume shaped and adapted to collect fluid spilling from the interior volume of the tank through the ventilation interface and at least partially prevent fluid flow into the ventilation pipe.

According to a possible implementation, the tank trailer further includes a lockable housing provided proximate the rear portion of the tank, and wherein the manhole and the ventilation access port are positioned within the lockable housing.

According to a possible implementation, the ventilation access port comprises a ventilation outlet adapted to be in fluid communication with a surrounding environment of the tank trailer.

According to a possible implementation, the internal volume of the collection pipe comprises a collection area defined in a bottom portion thereof for collecting the fluid, and wherein the ventilation pipe comprises an inlet communicating with the internal volume, the inlet being positioned vertically higher than the collection area.

According to a possible implementation, the tank trailer further including a drain system having a drain pipe connected to the collection pipe and adapted to drain the fluid from the collection area.

According to a possible implementation, the drain system comprises a drain system access port positioned within the lockable housing and provided with a drain pipe valve configured to prevent drained fluid from spilling inside the lockable housing.

According to a possible implementation, the ventilation interface comprises an interface pipe having a first end communicating with the interior volume of the tank, and a second end communicating with the internal volume of the collection pipe, and wherein the interface pipe comprises a ventilation elbow having an elbow apex positioned vertically higher than the collection pipe.

According to a possible implementation, the ventilation pipe comprises a secondary ventilation elbow having a secondary elbow apex positioned vertically higher than the collection pipe.

According to a possible implementation, the tank trailer further including a cleaning system comprising a washing fluid source and cleaning pipe adapted to supply washing fluid from the washing fluid source to at least one of the interior volume of the tank, the internal volume of the collection pipe and the ventilation interface.

According to a possible implementation, the cleaning system comprises a cleaning system access port positioned within the lockable housing and provided with a control valve configured to control the flowrate of washing fluid through the cleaning pipe.

Other features of advantages of the present invention will be better understood upon reading example implementations thereof, with reference to the appended drawings. While the invention will be described in conjunction with example implementations it will be understood that it is not intended to limit the scope of the invention to such implementations. On the contrary, it is intended to cover all alternatives, modifications and equivalents as defined in the present application.

DETAILED DESCRIPTION

As will be explained below in relation to various implementations, the present disclosure describes a tank trailer, and more specifically a tank trailer adapted for sanitary applications, and its associated systems. Broadly described, the present disclosure describes a tank trailer having various improvements to facilitate with sanitary applications, such as the transportation of milk, for example. The tank trailer includes multiple systems and components positioned proximate to ground level to improve safety parameters when interacting with the systems and/or components. The systems and components of the tank trailer are adapted to be positioned proximate the rear of the tank trailer, and at least partially within a common compartment to facilitate access thereto.

As will be described further below, in some implementations the tank trailer includes a cleaning system, a ventilation system and a collection system adapted to cooperate with one another. The collection system is adapted to prevent fluid spilling from the interior of the tank trailer and coming into contact with the other systems, such as the ventilation system, for example. The tank trailer further includes a sealable manhole communicating with an interior of the tank trailer and provided proximate to ground level at the rear of the tank trailer. Each system of the tank trailer can include one or more access ports provided proximate the manhole at the rear of the tank trailer, whereby the access ports and the manhole are housed within a compartment/housing. The compartment can thus be adapted to gather the access ports of the various systems, along with the manhole, in a common area, thereby facilitating access to the manhole and the access ports.

It is noted that tank trailers include a tank outlet valve for unloading purposes which is traditionally positioned at the rear of the tank. Therefore, by positioning the access ports and the manhole proximate the rear of the tank trailer, and thus proximate the tank outlet valve, the operator of the tank trailer avoids having to move between various locations around the tank trailer to access these components. Furthermore, loading bays used for loading/unloading tank trailers can be designed to be narrower since the components to which access is required/desired would be located in a common area, such as at the rear of the tank.

It is noted that the tank trailer of the present disclosure is described in relation with sanitary applications (e.g., the transport of milk). However, it should also be noted that the systems of the tank trailer can be adapted to be installed on tank trailers used for other applications, such as chemical applications, or any other application requiring transportation of fluids in a tank.

In some implementations, the various components (e.g., the different systems) of the tank trailer can be connected to one another in a manner such that fluid communication between at least some of these components is established. For example, the ventilation system can include pipes and/or conduits in fluid communication with the tank of the tank trailer to enable venting of the tank, and the collection system can be fluidly connected to a portion of the ventilation system such that spills from within the tank are collected by the collection system and redirected elsewhere instead of flowing into the ventilation system.

With reference to FIGS. 1 to 4, a tank trailer 10 according to a possible implementation is shown. The tank trailer 10 includes a tank 12 adapted to contain fluid, such as milk, water, gasoline or various chemicals, for example. More specifically, in this implementation, the tank 12 can be generally cylindrical, with a circular or elliptical cross-sectional area, and include a tank wall 20 connected to a trailer base 5. Moreover, the tank 12 has a rear wall 22 and a front wall 24 provided at opposite ends of the tank 12 and connected to the tank wall 20 and trailer base 5 to define an interior volume 13 of the tank (e.g., for containing fluid). It should be understood that the tank 12 includes a rear portion 16, a front portion 17, a top portion 18 and lateral portions 19. It should also be noted that the rear portion 16 of the tank trailer 10 includes the rear wall 22, although it is appreciated that the rear portion 16 can further include a section of the tank wall 20 (e.g., a section of the lateral portion s 19 proximate the rear wall 22).

The tank trailer 10 also includes a manhole 14 positioned proximate to ground level and which can be opened and closed to provide access to the interior 13 (seen in FIG. 7) of the tank. In this implementation, the manhole 14 is positioned proximate to ground level to facilitate access to the manhole 14, and thus facilitate access to the interior of the tank 12. Moreover, by positioning the manhole 14 proximate to ground level, the tank trailer operator is not required to climb on top of the tank 12 to reach the manhole 14, which can be dangerous in certain situations. It should be understood that, as used herein, the expression "at ground level" or "proximate to ground level" can refer to the position of an element which is within reach or easily reachable by a person (e.g., operator, truck driver, etc.) standing on the ground. In typical implementations, the manhole may, for example, be positioned at a height between about 1 meter and 3 meters from the ground level, such as at about 2 meters for example. In the present implementation, the manhole 14 is positioned on the rear wall 22 of the tank 12. However, it is appreciated that the manhole 14 can alternatively be positioned at any suitable location, such as on the tank wall 20, along the lateral portions 19, for example.

Figure 4:
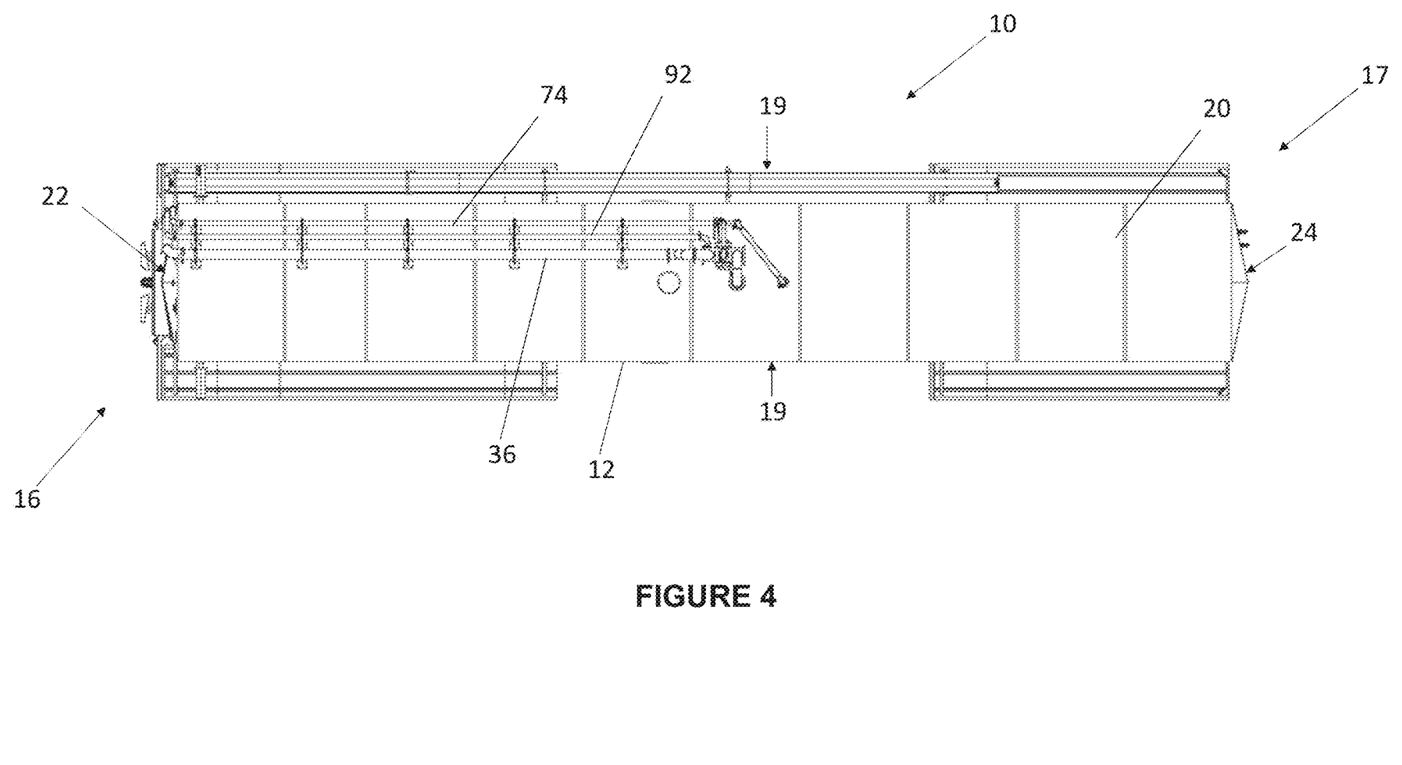
Figure 5:
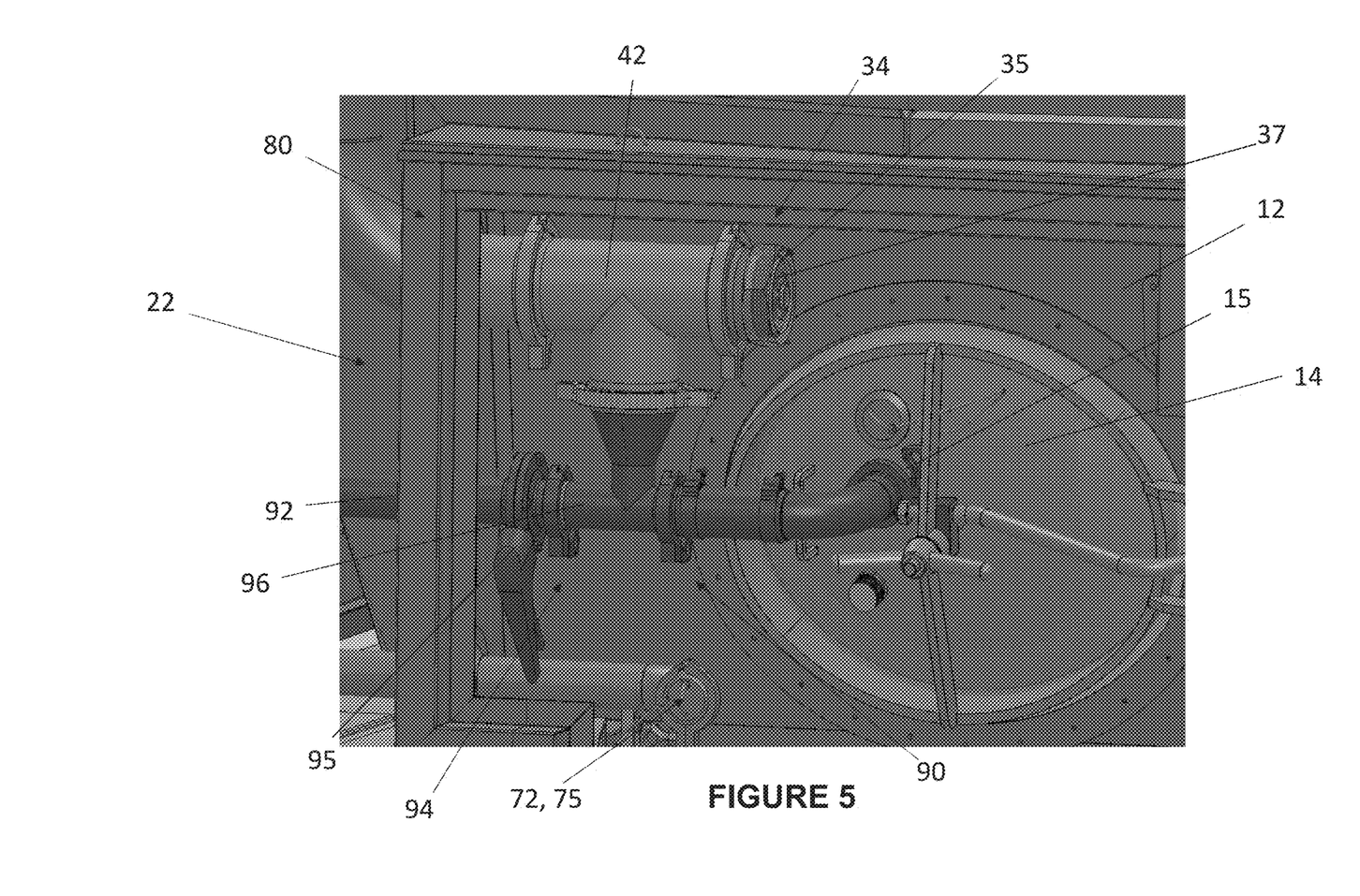
FIG. 5 is a perspective view of the rear end of a tank trailer, showing a manhole and various access ports, according to an implementation.
Figure 6:
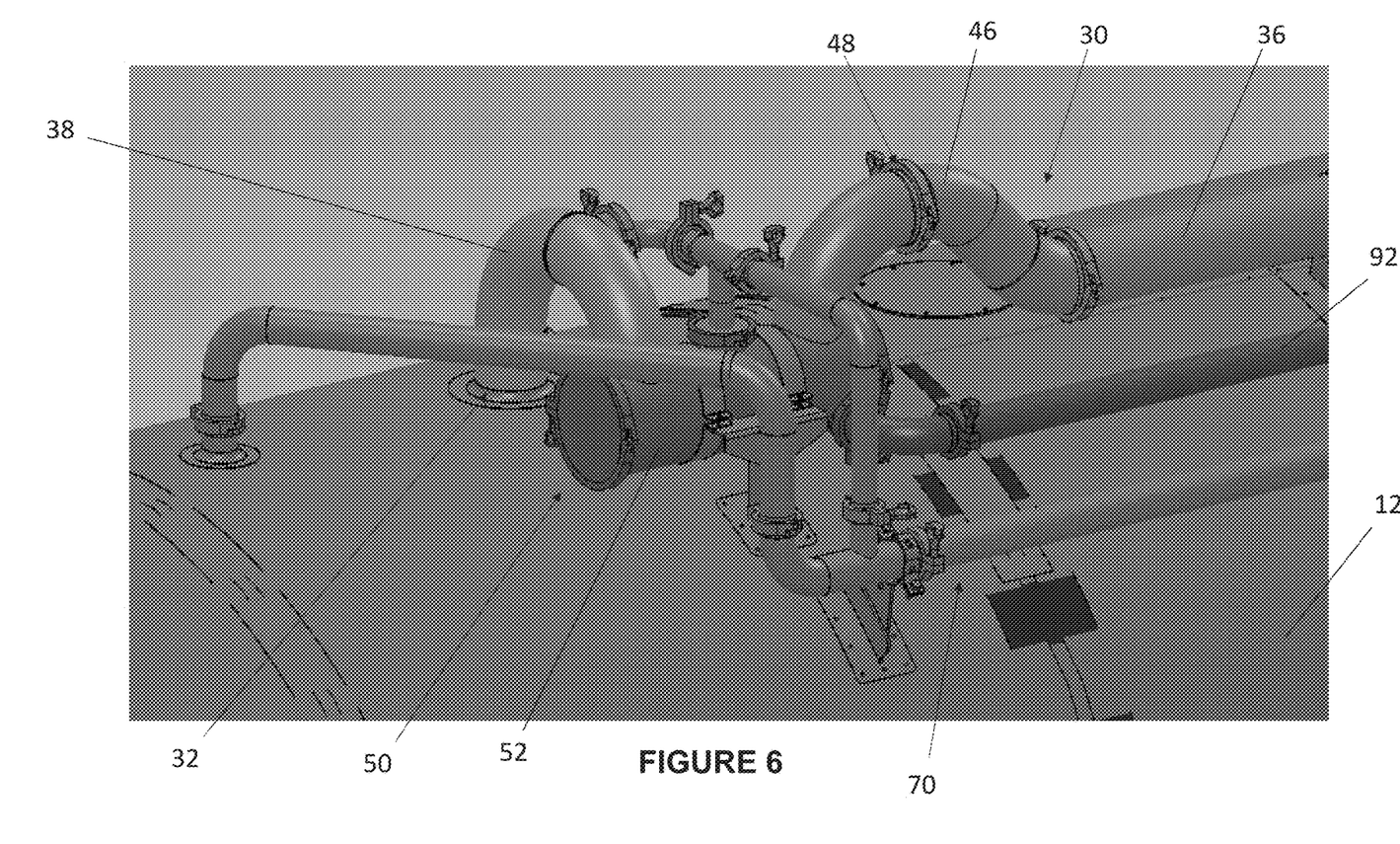
FIG. 6 is an enlarged perspective view of the top portion of the tank trailer, showing the plurality of pipes connected to one another and to the tank, according to an implementation.
Figure 7:
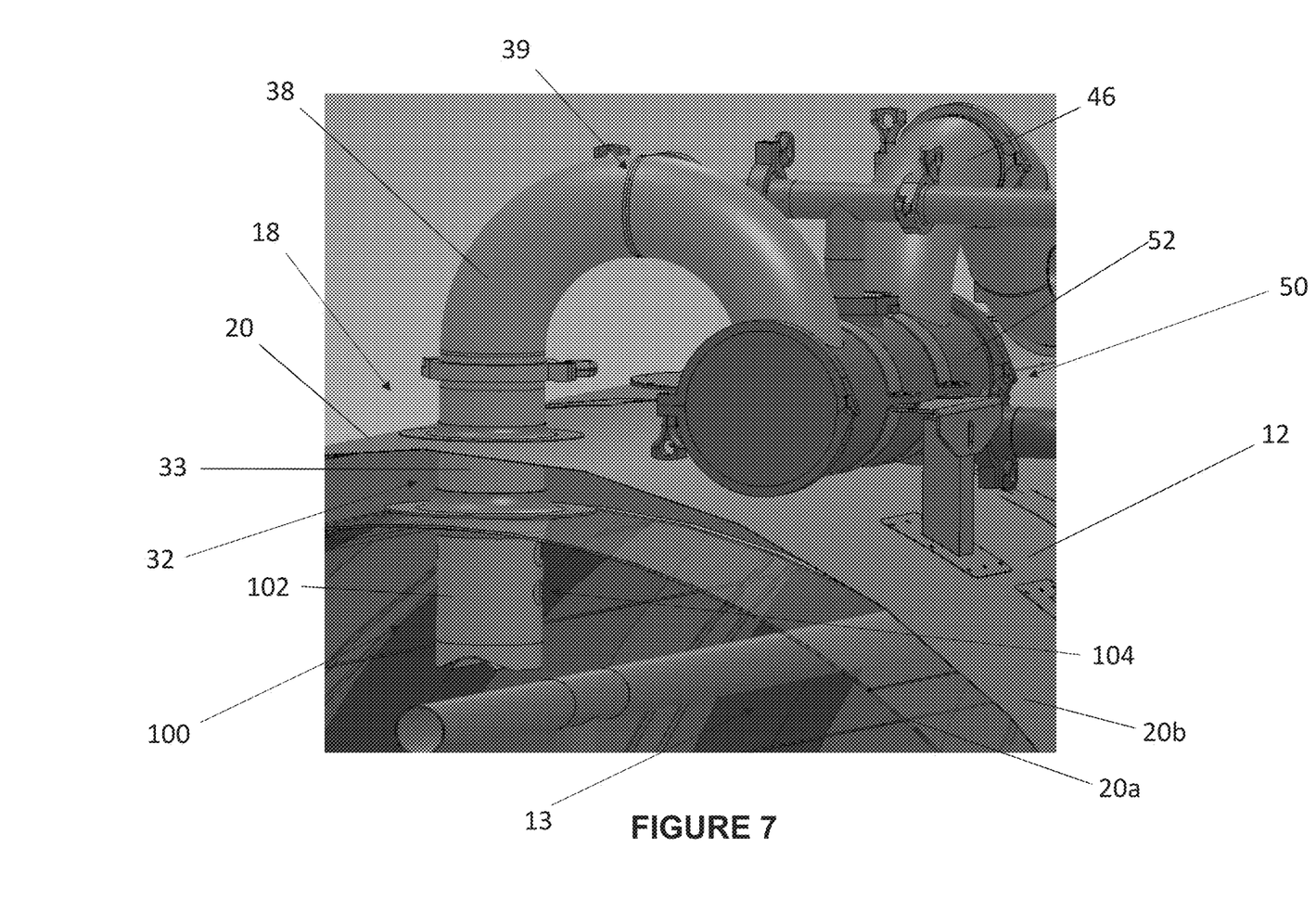
FIG. 7 is a partially cut-out view of the tank trailer shown in FIG. 6, showing a ventilation interface extending through the top portion of the tank to establish fluid communication with an interior of the tank, according to an implementation.

Now referring to FIGS. 5 to 7, in addition to FIGS. 1 to 4, in some implementations the tank trailer 10 also includes various systems configured to enable operation of various components of the tank trailer 10. In some implementations, the tank trailer 10 includes a ventilation system 30 adapted to establish fluid communication between the interior 13 and its surrounding environment, a collection system 50 adapted to prevent fluid contained within the tank 12 from spilling into other parts of the tank trailer 10, such as one or more of the other systems, and a cleaning system 70 adapted to clean the various elements and systems of the tank trailer.

Figure 1:
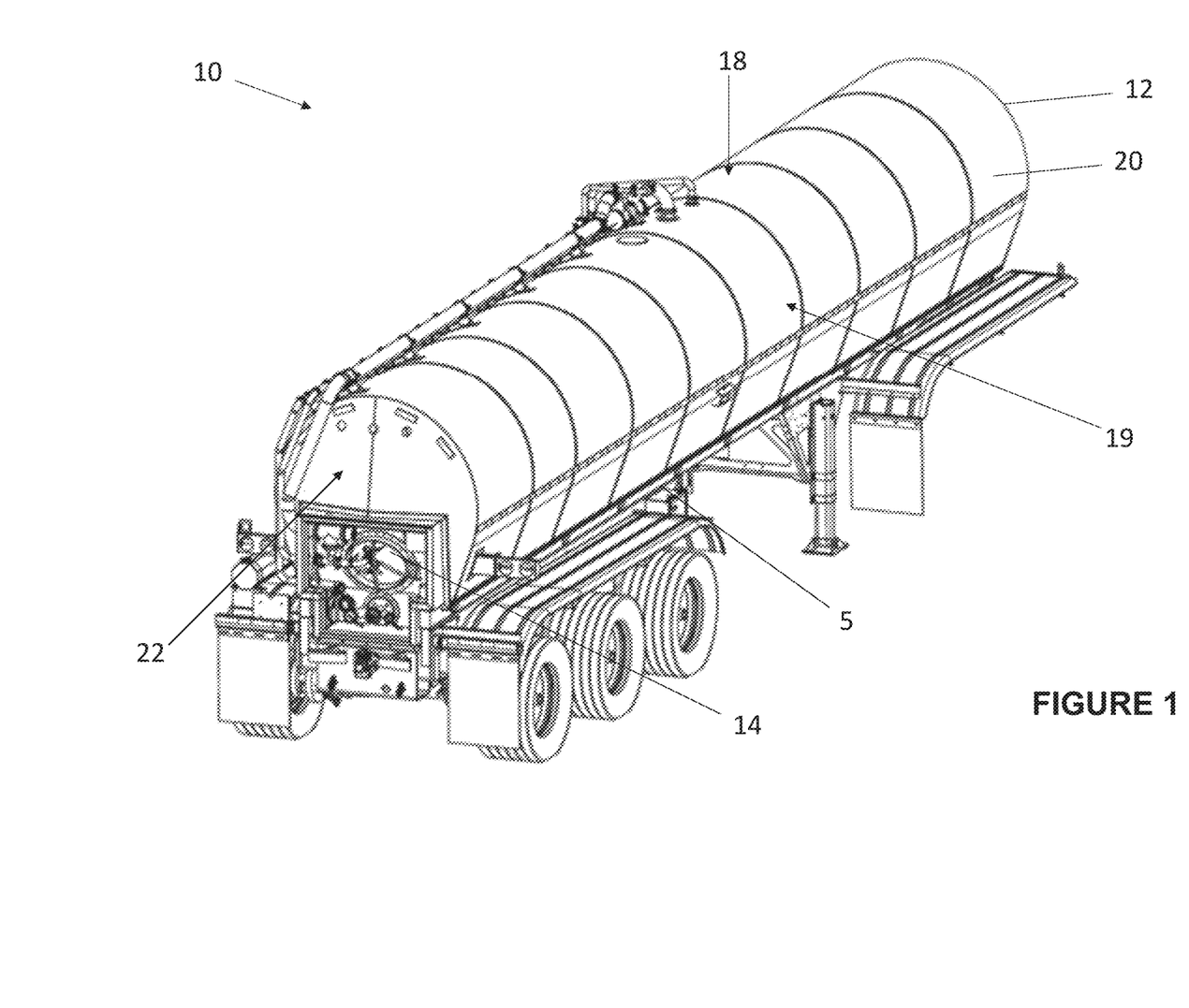
FIG. 1 is a rear perspective view of a tank trailer, according to an implementation.
Figure 2:
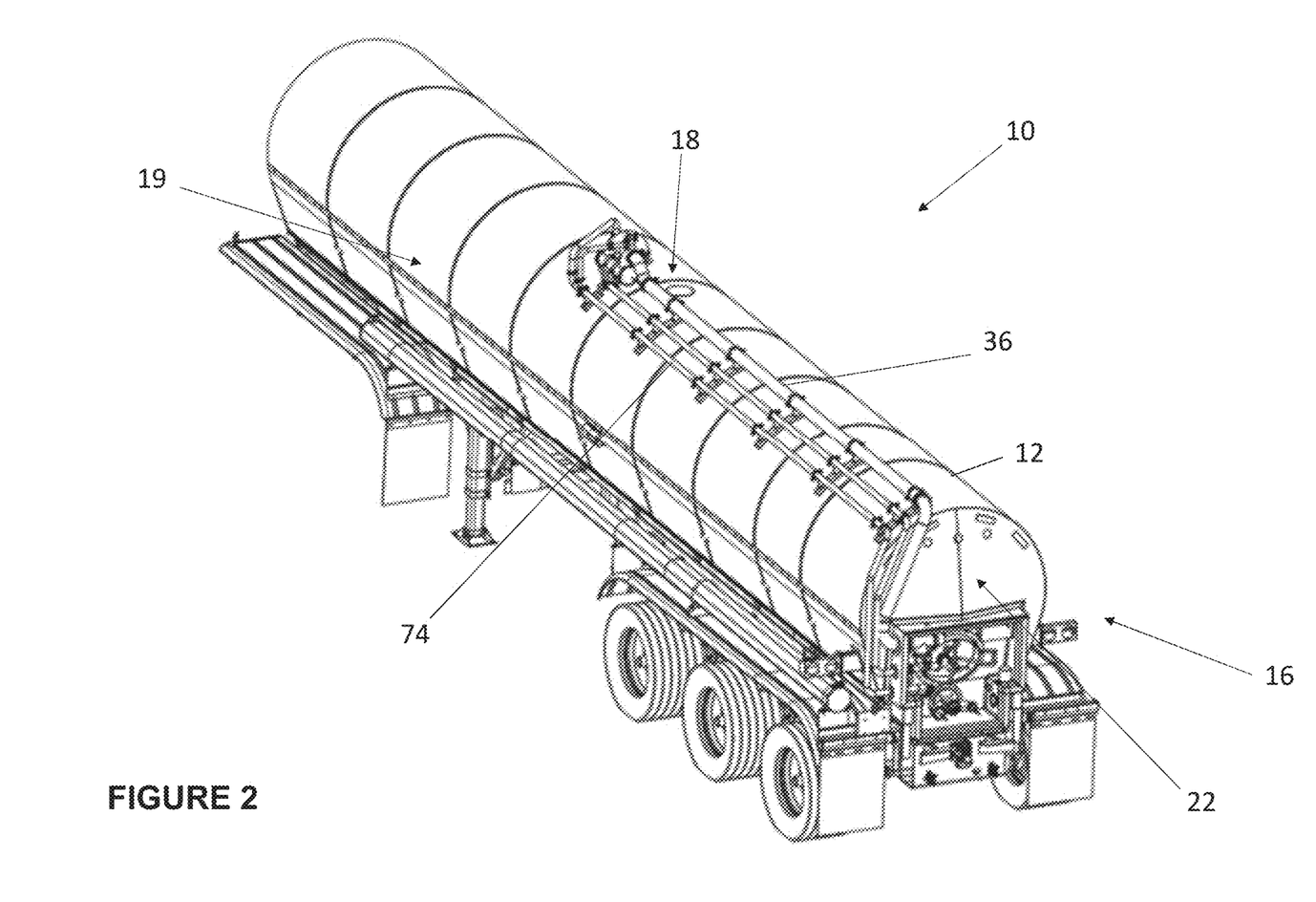
FIG. 2 is a rear perspective view of the tank trailer shown in FIG. 1, showing a plurality of pipes running along a portion of the tank trailer toward a rear end thereof, according to an implementation.
Figure 3:
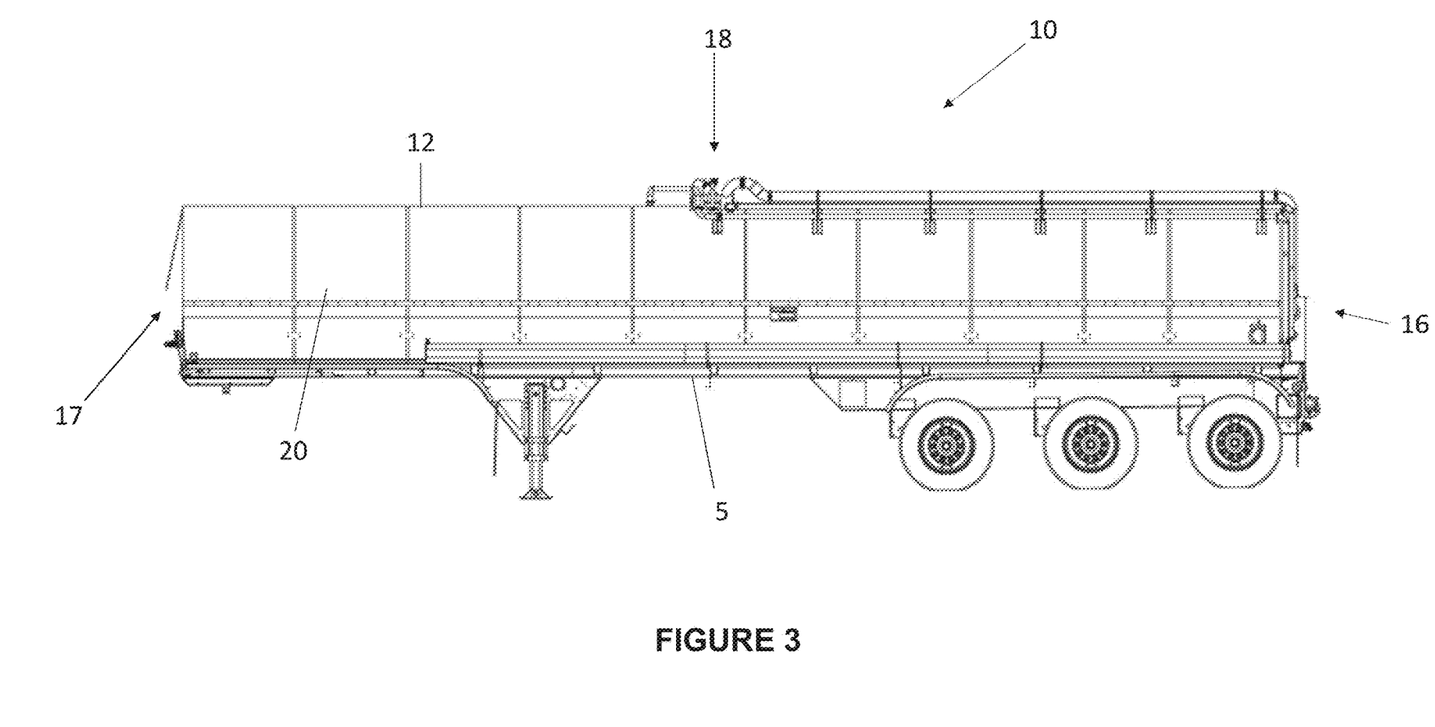
FIGS. 3 and 4 are side and top elevation views of the tank trailer shown in FIG. 1, showing the plurality of pipes running along a top portion of the tank trailer, according to an implementation.

As seen in FIGS. 1, 2 and 5, the manhole 14 can be positioned at the rear portion 16 of the tank 12 and within a lockable housing 80. In other words, the lockable housing 80 can be connected to the rear wall 22, although other configurations are possible, such as connecting the lockable housing 80 to the tank wall 20, such as along the lateral portions 19, for example. In some implementations, the lockable housing 80 can be configured to prevent unauthorized access to the components positioned therein, such as the manhole 14, for example.

As will be described further below, the ventilation system 30, the collection system 50 and the cleaning system 70 can have respective access ports accessible from ground level. In some implementations, the access ports can be positioned within the lockable housing 80 (e.g., along with the manhole 14) such that operation of the tank trailer 10 via the access ports can be accomplished at a centralized location (e.g., within the lockable housing 80). In the accompanying Figures, the lockable housing 80 is shown in an open configuration, and access to the components therein is granted. However, it is noted that the lockable housing 80 can include a door (not shown), or a sealing and/or locking mechanism (not shown), adapted to close the lockable housing 80, thereby preventing access to the components within. It is appreciated that any suitable sealing and/or locking mechanism can be used to lock the lockable housing 80 in the closed configuration and seal the access ports and manhole within.

Referring more specifically to FIGS. 5 to 8, the ventilation system 30 can include a ventilation interface 32 communicating with the interior 13 of the tank 12. In this implementation, the ventilation interface 32 includes an interface pipe 33 extending through an aperture defined in the tank 12 in order to communicate with the interior volume 13. For example, the interface pipe 33 can extend through the tank wall 20 proximate the top portion 18 such that the ventilation interface 32 communicates with the interior volume 13 from above. As seen in FIG. 7, the tank wall 20 can include an inner wall 20a defining the interior volume of the tank 12, and an outer wall 20b adapted to provide isolation to the tank 12. As such, it is noted that the interface pipe 33 can be adapted to extend through the inner and outer walls 20a, 20b to communicate with the interior volume 13. The ventilation system 30 further includes a ventilation access port 34 provided at the rear 16 of the tank (e.g., positioned on or proximate the rear wall 22) and proximate the manhole 14. It is noted that the ventilation access port 34 can include a ventilation outlet 35 communicating with the surrounding environment of the tank trailer 10. It should be noted that, when the lockable housing 80 is closed, the ventilation outlet 35 communicates with the interior of the lockable housing 80. In some implementations, the lockable housing 80 can be provided with one or more openings (not shown) defined therein to enable operation of the ventilation system 30 while the housing is closed. In other words, the openings of the lockable housing 80 are adapted to establish fluid communication between an interior of the housing and the environment surrounding the housing, while allowing the housing to remain closed and/or locked.

In addition, the ventilation system 30 includes one or more ventilation pipes 36 extending along a length of the tank 12 between the ventilation interface 32 and ventilation access port 34 for establishing fluid communication therebetween (e.g., between the interface pipe 33 and the ventilation outlet 35). It should thus be understood that the ventilation system 30 establishes fluid communication between the interior 13 of the tank 12 (e.g., via the ventilation interface 32) and the surrounding environment (e.g., via the ventilation outlet 35). The ventilation pipe(s) 36 can extend along the top portion 18, along the lateral portions 19, or a combination thereof. In some implementations, the interface pipe 33 can include a ventilation elbow 38 shaped and size to prevent, or reduce the amount of fluid spilling into the interface pipe 33 from flowing into subsequent parts of the ventilation system 30. In this implementation, the ventilation elbow 38 extends vertically higher than the pipe(s) to which it is connected to create an obstacle for fluid flow, whereby gravity assists in preventing fluid from flowing further into the ventilation system 30 (and other components). More specifically, the ventilation elbow 38 can be shaped to include an elbow apex 39 positioned vertically higher than the inlet and outlet of the ventilation elbow 38.

Figure 9:
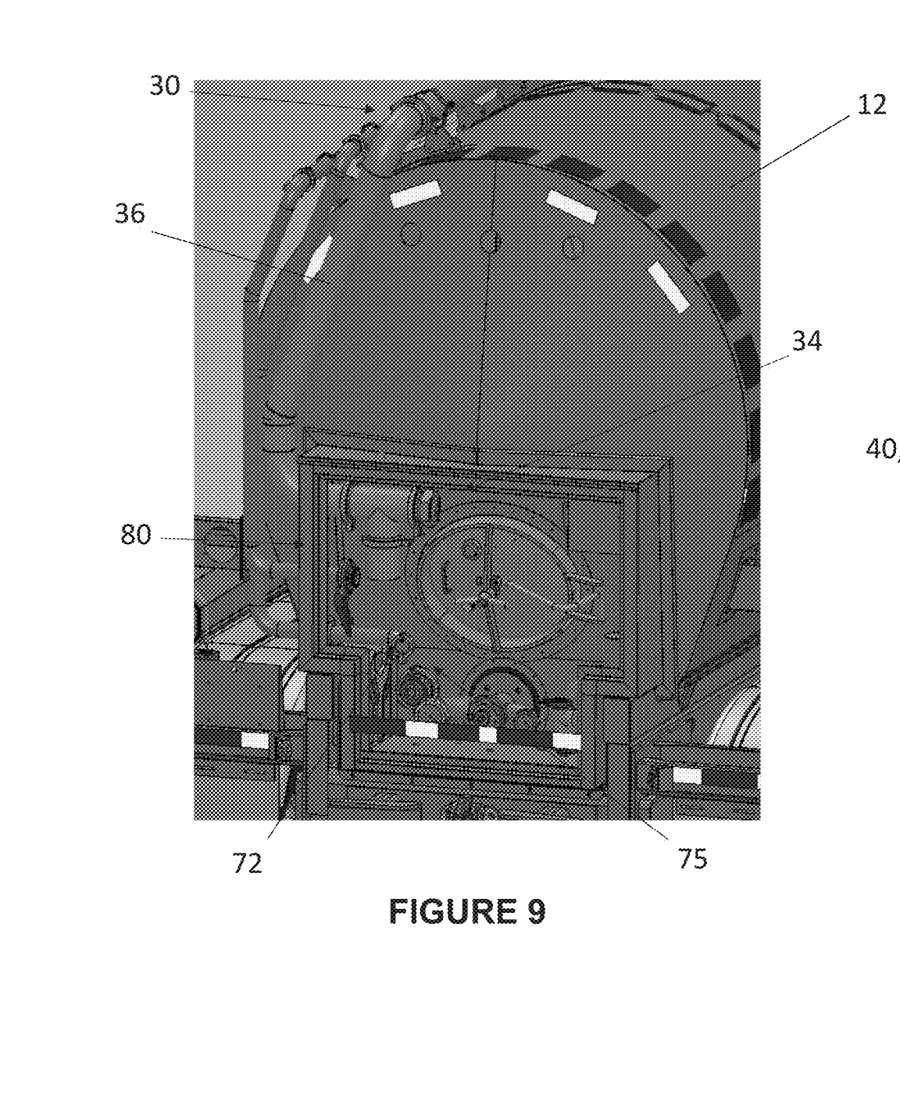
FIG. 9 is a rear view of a tank trailer, showing a ventilation access port provided proximate a manhole of the tank trailer, according to an implementation.
Figure 9A:
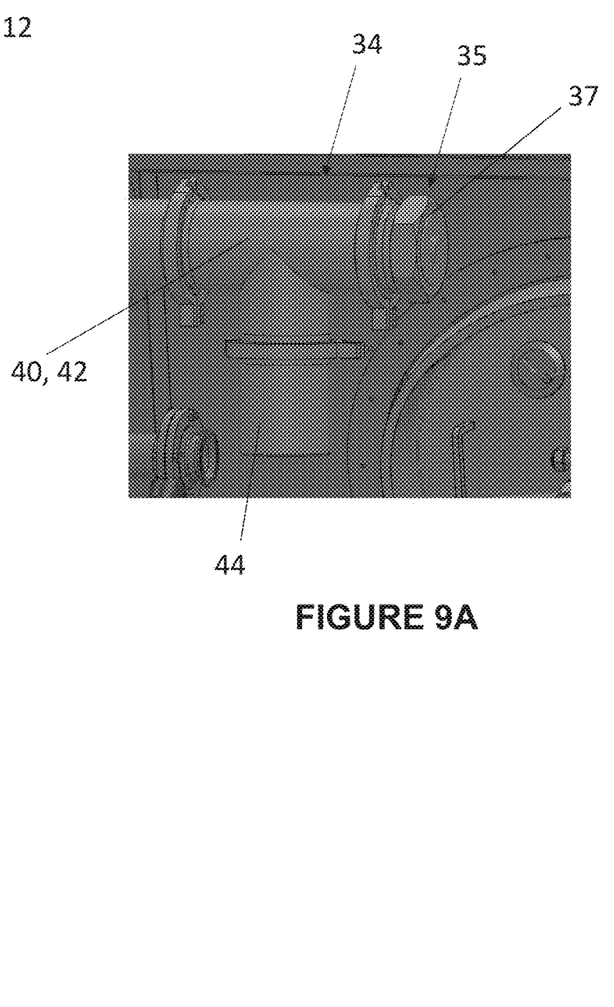
FIG. 9A is an enlarged view of the ventilation access port shown in FIG. 9.

As seen in FIGS. 5, 9 and 9A, the ventilation access port 34 can be positioned within the lockable housing 80 at the rear of the tank 12. In this implementation, the ventilation access port 34 includes a junction pipe element 40 having multiple branches for splitting the ventilation pipe 36 into separate pipes. The junction pipe element 40 can include a T-joint 42 connected to the ventilation pipe 36 and having two (2) branches extending therefrom, and each having respective openings. In alternative implementations, the junction pipe element 40 can be adapted to split the ventilation pipe 36 into any suitable number of pipes, such as three, four or five pipes, for example. In the present implementation, the ventilation outlet 35 corresponds to the opening of at least one of the two branches of the T-joint 42, and the second branch can be provided with a cap 44 covering the opening thereof to catch and gather any fluid that could have reached the ventilation access port 34 during product hauling. In some implementations, the ventilation system 30 can include a pressurization device 37 adapted to adjust or maintain a pressure within the pipes of the ventilation system 30 (e.g., within the ventilation pipe 36) relative to the atmospheric pressure (i.e., the pressure of the surrounding environment). For example, the pressurization device 37 can include an Olson vent 37 configured to moderate the pressure within the pipes of the ventilation system 30 to prevent fluid from flowing (e.g., spilling) into the ventilation system 30. It should be noted that the Olsen vent 37 is configured to open once a predetermined pressure differential is applied thereto, such as between about 1 psi to 5 psi, for example. As such, the Olsen vent remains closed during transport such that the air present in the ventilation pipe 36 is maintained therein and prevents fluid from entering. In this implementation, the Olson vent 37 is provided proximate the ventilation outlet 35 and is also positioned within the lockable housing 80. However, it is appreciated that other devices and methods for preventing fluid to flow into the ventilation pipe 36 are possible, such as positioning a cap and/or a valve at the outlet 35 for maintaining a desired pressure within the ventilation pipe 36, for example.

Figure 8:
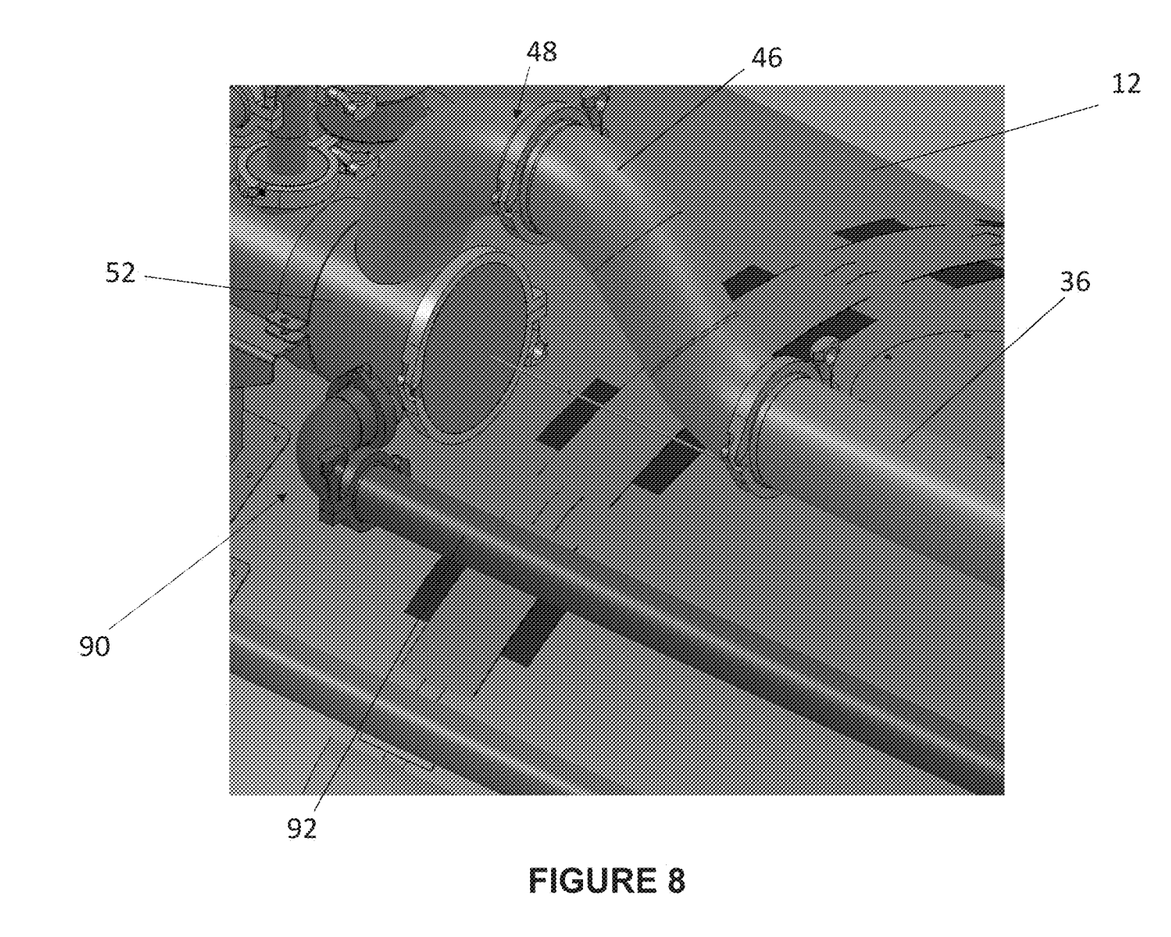
FIG. 8 is a perspective view of the top portion of the tank trailer shown in FIG. 6, showing a ventilation pipe and a drain pipe connected to and extending from a collection pipe, according to an implementation.

Now referring to FIGS. 6 to 8, the collection system 50 can be adapted to prevent, or at least reduce the amount of fluid spilling out of the tank 12 and into other parts of the tank trailer 10. In the present implementation, the collection system 50 includes a collection pipe 52 fluidly connected to the ventilation system 30, among others. More specifically, the collection pipe 52 can be connected between two sections of pipe and is adapted to receive some fluid from a first section of pipe, and prevent the fluid from flowing into the second section of pipe. In the present implementation, the collection pipe 52 is coupled between the ventilation elbow 38 and the ventilation pipe 36 to prevent fluid from flowing from the ventilation elbow 38 to the ventilation pipe 36 and toward the ventilation access port 34. In other words, the collection pipe 52 is shaped, sized and configured to receive and collect fluid that spilled from the tank 12 and managed to flow through the ventilation elbow 38.

Figure 11:
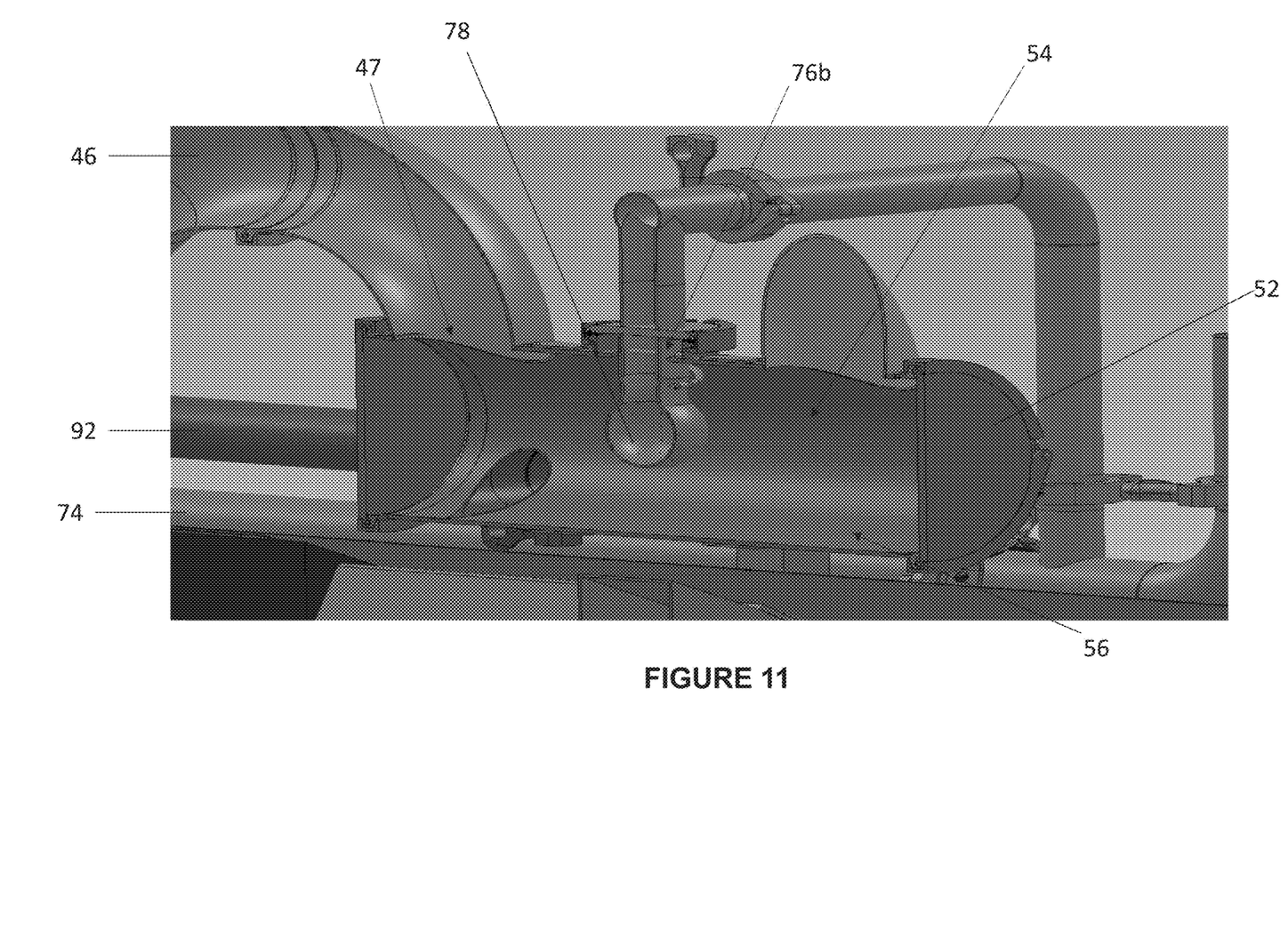
FIG. 11 is a cross-sectional view of a collection pipe installed on the top portion of the tank trailer shown in FIG. 6, showing a cleaning pipe, a drain pipe and ventilation pipes in fluid communication with respective portions of the collection pipe, according to an implementation.

With reference to FIG. 11, in addition to FIGS. 6 to 8, in some implementations, the collection pipe 52 can be generally cylindrical and includes an internal volume 54 for collecting fluid. The size of the collection pipe 52, and thus of the internal volume 54, can be designed based on the anticipated amount of fluid to spill from the tank 12. For example, during standard hauls, it is common for about one to three cups of fluid to spill from the tank 12 through the ventilation interface 32, make its way over the ventilation elbow 38 and into the collection pipe 52. In this implementation, the collection pipe 52 has a diameter between about 3 inches and 9 inches, and a length between about 8 inches and 15 inches defining an internal volume 54 adapted to receive and collect the spilt fluid. However, it is appreciated that the collection pipe 52 can have any other suitable shape, such as a rectangular box, and/or size, such as smaller or bigger than the exemplary dimensions provided herein, for example.

Moreover, the internal volume 54 can include a collection area 56 in which fluid is received and can accumulate (i.e., an area in which fluid can at least partially pool). It should be understood that the collection area 56 corresponds to a bottom portion (e.g., bottom half) of the collection pipe 52, whereby fluid flowing into the collection pipe 52 is collected at the bottom of the collection pipe 52 (i.e., within the collection area 56). In some implementations, the collection pipe 52 can be coupled to the tank 12 via braces, fasteners and/or any other suitable means. However, it is appreciated that the collection pipe 52 can simply be coupled between two or more pipes.

In this implementation, the ventilation system 30 can include a secondary ventilation elbow 46 extending between the ventilation pipe 36 and the collection pipe 52. Similar to the ventilation elbow 38, the secondary ventilation elbow 46 is shaped in a manner to have a portion thereof be vertically higher than the collection pipe 52, thereby impeding fluid within the collection pipe 52 from flowing into the ventilation pipe 36. In this implementation, the ventilation elbow 38 and the secondary ventilation elbow 46 connect to a top portion of the collection pipe 52. More specifically, the inlet 47 of the secondary ventilation elbow 46 is positioned vertically higher than the collection area 56 of the collection pipe 52. Therefore, fluid being received by the collection pipe 52 can pool in the collection area 56 without entering the ventilation pipe 36 (e.g., due in part to gravity) through the inlet 47 of the secondary ventilation elbow 46. In some implementations, fluid can pool within the internal volume 54 of the collection pipe 52 to an extent where a portion thereof spills into the inlet 47 of the secondary ventilation elbow 46 (e.g., due to turbulences). However, it is noted that the secondary ventilation elbow 46 can be shaped to include an apex 48 positioned vertically higher than the inlet 47, thereby further preventing, or at least impeding, fluid flow along the ventilation pipe 36 and toward the ventilation access port 34.

Now referring to FIGS. 5 to 11, the tank trailer 10 further includes the cleaning system 70 configured to clean various components of the tank trailer 10. It is appreciated that, for sanitary applications, such as the transport of milk, for example, the cleaning system 70 preferably cleans all the components that come in contact with the milk. In this implementation, the cleaning system 70 includes a washing fluid inlet 72 configured to be connected to a washing fluid source (not shown) and a cleaning pipe 74 connected to the washing fluid inlet 72 and communicating with various components of the tank trailer 10 for supplying washing fluid to these components. As seen in FIGS. 2 and 4, the cleaning pipe 74 extends along a length of the tank 12 between the washing fluid inlet and the components to be cleaned (e.g., the components to which washing fluid can be supplied).

The cleaning system 70 also includes a cleaning system access port 75 provided at the rear of the tank trailer 10 (e.g., proximate the manhole 14 and/or the ventilation access port 34). The cleaning system access port 75 is therefore adapted to be accessible from ground level, and can include a control valve (now shown) for controlling the flowrate of washing fluid from the washing fluid source, through the cleaning pipe, and to the tank trailer components. The cleaning system access port 75 is preferably positioned within the lockable housing 80 to increase security and prevent unauthorized access thereto.

Figure 10:
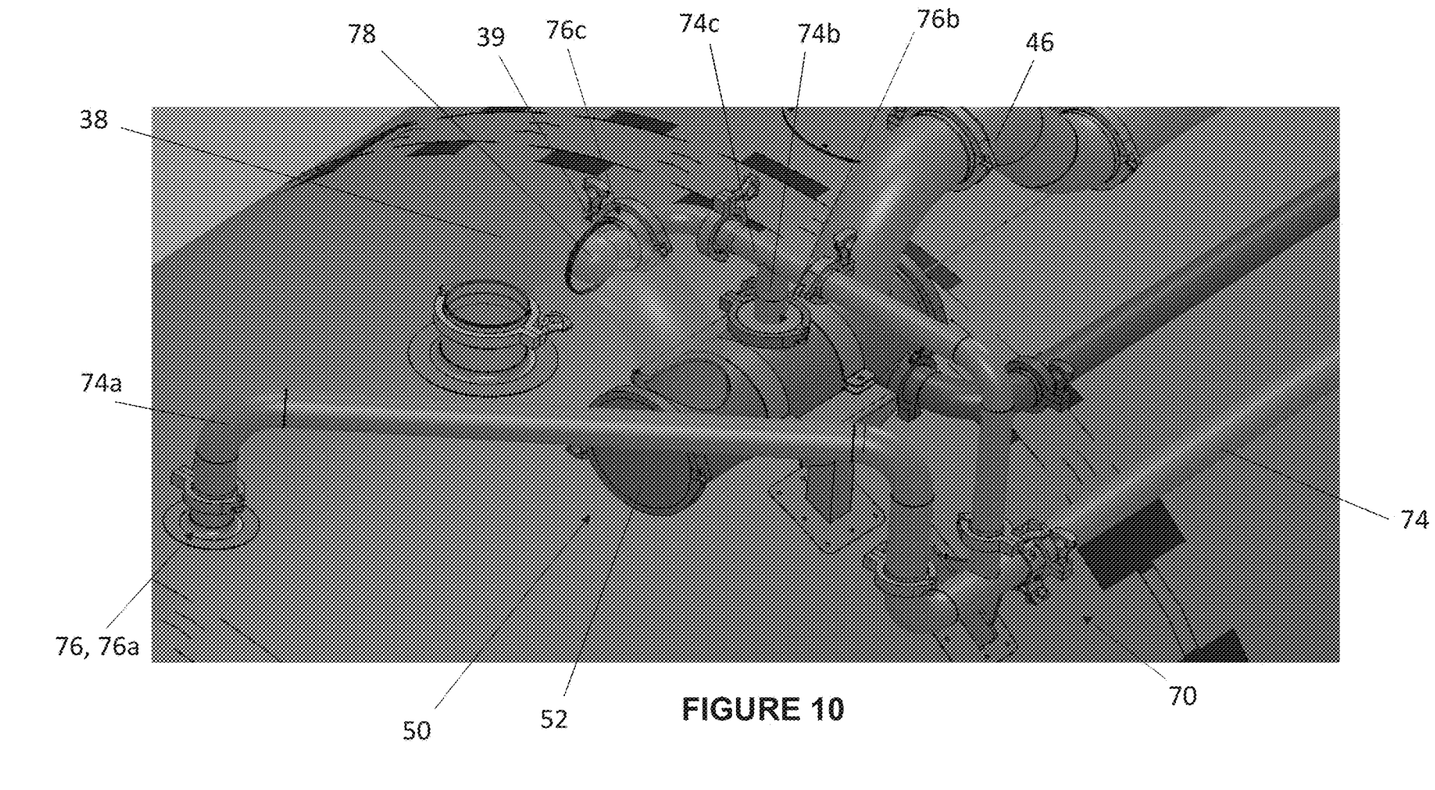
FIG. 10 is a top view of the tank trailer shown in FIG. 6, showing a spray-ball provided within an interior of a ventilation elbow, according to an implementation.

In some implementations, the cleaning pipe 74 can be adapted to supply washing fluid to at least the interior volume 13 of the tank 12, the collection pipe 52 and the ventilation elbow 38 since fluid (e.g., milk) is more likely to flow in/through these components. As seen in FIG. 10, the cleaning pipe 74 can include an arrangement of cleaning pipes 74, such as a tank cleaning pipe 74a in fluid communication with the interior 13 of the tank 12 to supply washing fluid therein, a collection cleaning pipe 74b and a ventilation elbow cleaning pipe 74c configured to supply washing fluid to the collection pipe 52 and the ventilation elbow 38, respectively. In some implementations, the collection cleaning pipe 74b is fluidly connected to and extends from the ventilation elbow cleaning pipe 74c, which is in turn fluidly connected to the tank cleaning pipe 74a which extends along the tank 12 towards the washing fluid inlet 72. In other words, the cleaning pipe 74 extends from the washing fluid inlet 72 and splits in multiple cleaning pipes (74a, 74b, 74c) to supply washing fluid to the corresponding components.

In some implementations, each cleaning pipe 74 can include respective cleaning interfaces 76 communicating with the interior of the corresponding component. For example, the tank cleaning pipe 74a communicates with the interior volume 13 of the tank 12 via a tank cleaning interface 76a. Similarly, the collection cleaning pipe 74b communicates with the interior of the collection pipe 52 via a collection cleaning interface 76b, and the ventilation elbow cleaning pipe 74c communicates with the interior of the ventilation elbow 38 via a ventilation elbow cleaning interface 76c. Each cleaning interface 76 can be provided with a dispersion device, such as a spray-head or spray-ball, configured to effectively disperse washing fluid within the corresponding components and clean them. For example, and as seen in FIGS. 10 and 11, the ventilation elbow cleaning interface 76c is provided with a spray-ball 78 proximate the elbow apex 39 in order to clean both sides of the ventilation elbow 38. The collection cleaning interface 76b can also be provided with a spray-ball 78 extending into the collection pipe 52 from above to thoroughly clean the interior of the collection pipe 52 since milk can tend to collect/pool therein. The tank cleaning interface 76a can be provided with any suitable dispersion device known in the art, such as the spray-head disclosed in US Patent No. 9.834.128, for example.

Referring back to FIGS. 5 to 8, the tank trailer 10 can include a drain system 90 adapted to drain fluid from at least one of the collection system, ventilation system and cleaning system. In this implementation, the drain system 90 includes a drain pipe 92 extending along a length of the tank 12 and having a first end fluidly connected to the collection pipe 52 and a second end positioned proximate the rear of the tank 12. The drain system 90 can include a drain system access port 94 provided at the rear 16 of the tank trailer 12 proximate the manhole 14, ventilation access port 34 and/or cleaning system access port 75. The drain system access port 94 is therefore adapted to be accessible from ground level, and is preferably positioned within the lockable housing 80 to increase security and prevent unauthorized access thereto. The drain system access port 94 can include a drain pipe valve 95 adapted to prevent drained fluid from spilling inside the lockable housing 80. In some implementations, the drain system 90 can be adapted to drain the collection pipe 52 directly onto the ground or to another apparatus, for example. In other words, the drain system 90 can include one or more drain outlets positioned in a manner to allow draining fluid directly onto the ground (e.g., instead of within the tank 12). It should be noted that the contents being transported by such tanks are preferably safe for the environment, such as potable water for example, and can thus be dumped/drained onto the ground.

In this implementation, and as best seen in FIGS. 8 and 11, the drain pipe 92 is connected to a bottom half of the collection pipe 52. Therefore, the drain pipe 92 is in fluid communication with the collection area 56 of the collection pipe 52 in order to promote a transfer of fluid from the collection pipe 52 to the drain pipe 92. In some implementations, the drain pipe 92 is connected to a lowermost point of the collection pipe 52 such that the internal volume 54 of the collection pipe 52 can be passively drained due to gravity, although it is appreciated that other configurations are possible. For example, the drain system 90 can include a pump configured to pump the fluid from within the collection pipe 52. In such implementations, it is appreciated that the drain pipe 92 can be connected to any other suitable portion of the collection pipe 52.

The drain pipe 92 can be adapted to evacuate fluid collecting in the collection pipe 52 to prevent it from flowing into the ventilation pipe 36. However, it should be noted that the drain system 90 can be adapted to drain the various pipes from washing fluid following a cleaning process. In some implementations, once the tank 12 has been emptied (e.g., following a delivery), washing fluid can be injected to the various pipes and into the tank 12. For example, washing fluid injected into the ventilation elbow 38 can flow (fall) into the collection pipe 52 and tank 12. The washing fluid in the collection pipe 52 can be drained therefrom via the drain pipe 92 connected thereto.

In another implementation, the drain system 90 can be part of the cleaning system 70, where a single pipe (or set of pipes) is used for both providing cleaning fluid to the various systems of the tank trailer 10 and within the tank 12, and to drain the fluids from these systems and from within the tank. For example, the cleaning pipe 74 can be used for initially supplying washing fluid to the components of the tank trailer (e.g., the tank, the collection pipe, the ventilation pipe(s), etc.), and subsequently used to drain the fluids (e.g., residual washing fluid and/or other) from these components. The position, configuration and cooperation between the cleaning pipe 74 and the various components of the tank trailer can therefore be adapted to facilitate both functions (e.g., supplying washing fluid and draining fluids).

With reference to FIG. 5, in some implementations, the drain system 90 can be fluidly connected to the interior volume 13 of the tank 12 in a manner such that fluid drained from the various systems of the tank trailer 10 (e.g., washing fluid) can be routed to within the tank 12. The interior volume 13 can then be drained via any suitable method to effectively evacuate the fluid from within the various systems of the tank trailer 10 and from the tank 12 simultaneously. In the present implementation, the drain system 90 includes a pipe manifold 96 removably connectable between the drain pipe 92 and manhole 14. More specifically, the manhole 14 can be provided with a manhole connection 15 configured to provide access to within the tank 12 through the manhole 14. The pipe manifold 96 therefore establishes fluid communication between the drain pipe 92 and the interior of the tank 12 (via the manhole connection 15). Once fluid has been drained from the pipes, the tank 12 can be drained via standard procedures, such as via a tank valve outlet, for example. It is appreciated that, in alternative implementations, the drain pipe 92 can be adapted to route drained fluid to the tank 12 through the manhole 14 in the open configuration. In other words, to drain fluids from the various systems back into the tank, the manhole 14 can simply be opened, and the drain pipe 92 and/or pipe manifold 96 can be positioned to allow fluid to flow into the tank 12 through the opened manhole.

It should be noted that, during the cleaning process, washing fluid can cause the collection pipe 52 to overflow and spill into the venting pipe 36. As such, in this implementation, the pipe manifold 96 can be connected to the second branch of the T-joint 42 to allow the overflowing fluid to be drained via the pipe manifold 96, which routes the fluid into the tank via the manhole connection 15, as described above. It is appreciated that, during the cleaning process, the cap 44 (seen in FIG. 9A) can be removed from the T-joint 42 to enable connection of the pipe manifold 96. In addition, it is noted that the ventilation system 30 remains operable to enable ventilation of the tank 12 during and after the cleaning process to prevent pressure fluctuations, which can cause some structural damage to the ventilation system and/or a complete collapse thereof.

Referring back to FIG. 7, during operation of the tank trailer 10, such as during transport, turbulence can cause the contents within the tank 12 (also referred to as lading) to shift back and forth. For example, the acceleration and deceleration of the tank trailer can create waves of fluids inside the tank, potentially causing fluids to reach and spill within one or more components of the tank trailer 10, such as within the ventilation elbow 38 through the ventilation interface 32. In some implementations, the ventilation interface 32 can be provided with a device or mechanism adapted to prevent, or at least reduce the amount of fluid spilling into the ventilation elbow 38, and possibly into the collection pipe 52.

More specifically, the ventilation interface 32 can include an anti-wave mechanism 100 connected to the interface pipe 33 and extending within the interior 13 of the tank 12. In this implementation, the anti-wave mechanism 100 includes an insert 102 connected to the interface pipe 33 and extending within the tank 12 by any suitable length adapted to prevent fluids from flowing up the insert 102 due to the waves of fluid, for example and as described above. The insert 102 can be a length of pipe connectable to the interface pipe 33, effectively extending the length of the interface pipe 33. The insert 102 can have generally the same dimensions (e.g., diameter, thickness, etc.) as the interface pipe 33, although other configurations are possible. It should be noted that, when the tank 12 is full, the anti-wave insert 102 can be partially submerged. Therefore, in some implementations, the anti-wave insert 102 can be provided with apertures 104 defined therethrough proximate the top portion 18 of the tank 12 to promote ventilation of the tank 12. In the illustrated implementation, the anti-wave insert 102 has four (4) apertures 104, although it is appreciated that any other suitable number of apertures 104 is possible and may be used to promote ventilation of the interior 13 of the tank 12.

It will be appreciated from the foregoing disclosure that there is provided a tank trailer that, by virtue of its design and components, as explained herein, and the particular configurations thereof, advantageously enables operations of the tank trailer at the rear end of the tank, from a centralized location (e.g., within the lockable housing), and from ground level. The position and configuration of the various access ports, along with the manhole, allow for operation of the tank trailer in a more efficient, more reliable, more adjustable, more versatile, more adaptable and/or more desirable manner, compared to what is possible with respect to other known tank trailers. Although the various implementations described herein include positioning the access ports and the manhole within the housing at the rear of the tank, it is appreciated that the housing can alternatively be located at any other suitable location on and/or around the tank, such as on the sides, at the front, below the tank (e.g., on a bottom surface of the tank, or on the trailer), for example.

Moreover, it should be understood that the anti-wave mechanism, the ventilation elbow, the collection pipe and the drain system all cooperate with one another to prevent fluid from entering the ventilation pipe 36. It should also be understood that, if fluids are prevented access to the ventilation pipe 36 and subsequent components (i.e., from the tank 12), then these components are not required to be connected to the cleaning system to be directly and thoroughly cleaned, thereby facilitating the overall cleaning process of the tank trailer 10. However, it is noted that the ventilation pipe 36 can be connected to the cleaning system, thereby permitting the ventilation system (or at least a portion thereof) to be cleaned, when necessary and as required in certain fields, such as in sanitary application, for example.

Moreover, although the implementations of the tank trailer and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation therebetween, as well as other suitable geometrical configurations, may be used for the tank trailer, as it is briefly explained herein and as can be easily inferred herefrom by a person skilled in the art. Moreover, it is appreciated that positional descriptions such as "top", "bottom", "above", "below", "left", "right" and the like should, unless otherwise indicated, be taken in the context of the figures and should not be considered limiting.

Furthermore, in the context of the present description, it will be considered that all elongated objects will have an implicit "longitudinal axis" or "centerline", such as the longitudinal axis and centerline of a pipe, for example, and that expressions such as "connected" and "connectable", "attached" and "attachable" or "mounted" and "mountable", may be interchangeable, in that the present disclosure includes various components for assembling various systems of a tank trailer.

Moreover, components of the tank trailer and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

Several alternative implementations and examples have been described and illustrated herein. The implementations described above are intended to be exemplary only. A person of ordinary skill in the art would appreciate the features of the individual implementations, and the possible combinations and variations of the components. A person of ordinary skill in the art would further appreciate that any of the implementations could be provided in any combination with the other implementations disclosed herein. It is understood that the invention may be embodied in other specific applications or configurations. The present examples and implementations, therefore, are to be considered in all respects as illustrative and not restrictive, and the invention is not to be limited to the details given herein. Accordingly, while the specific implementations have been illustrated and described, numerous modifications come to mind without significantly departing from the invention.

In the present disclosure, an implementation is an example or implementation of the tank trailer and/or associated components. The various appearances of "one implementation," "an implementation" or "some implementations" do not necessarily all refer to the same implementations. Although various features may be described in the context of a single implementation, the features may also be provided separately or in any suitable combination. Conversely, although the tank trailer may be described herein in the context of separate implementations for clarity, it may also be implemented in a single implementation. Reference in the specification to "some implementations", "an implementation", "one implementation", or "other implementations", means that a particular feature, structure, or characteristic described in connection with the implementations is included in at least some implementations, but not necessarily in all implementations.

It should also be appreciated that similar features of the drawings have been given similar reference numerals. To preserve the clarity of the drawings, some reference numerals have been omitted when they were already identified in a preceding figure.

The invention claimed is:

1. A tank trailer comprising:
   a tank having an interior volume adapted to contain fluid, the tank comprising a rear portion;
   a manhole extending through the tank and positioned proximate the rear portion and proximate to ground level;
   a ventilation system comprising:
   a ventilation interface communicating with the interior volume of the tank;
   a ventilation access port having a ventilation outlet positioned proximate the rear portion and proximate to ground level;

a ventilation pipe adapted to establish fluid communication between the ventilation outlet and ventilation interface;

a collection system comprising:

a collection pipe coupled between the ventilation interface and the ventilation pipe, the collection pipe defining an internal volume shaped and adapted to collect fluid spilling from the interior volume of the tank through the ventilation interface and at least partially prevent fluid flow into the ventilation pipe.

2. The tank trailer of claim 1, further comprising a lockable housing provided proximate the rear portion of the tank, and wherein the manhole and the ventilation access port are positioned within the lockable housing.

3. The tank trailer of claim 2, further comprising a cleaning system comprising a washing fluid source and cleaning pipe adapted to supply washing fluid from the washing fluid source to at least one of the interior volume of the tank, the internal volume of the collection pipe and the ventilation interface.

4. The tank trailer of claim 3, wherein the cleaning system comprises a cleaning system access port positioned within the lockable housing and provided with a control valve configured to control the flowrate of washing fluid through the cleaning pipe.

5. The tank trailer of claim 1, wherein the ventilation access port comprises a ventilation outlet adapted to be in fluid communication with a surrounding environment of the tank trailer.

6. The tank trailer of claim 1, wherein the internal volume of the collection pipe comprises a collection area defined in a bottom portion thereof for collecting the fluid, and wherein the ventilation pipe comprises an inlet communicating with the internal volume, the inlet being positioned vertically higher than the collection area.

7. The tank trailer of claim 6, further comprising a drain system having a drain pipe connected to the collection pipe and adapted to drain the fluid from the collection area.

8. The tank trailer of claim 7, wherein the drain system comprises a drain system access port positioned within the lockable housing and provided with a drain pipe valve configured to prevent drained fluid from spilling inside the lockable housing.

9. The tank trailer of claim 1, wherein the ventilation interface comprises an interface pipe having a first end communicating with the interior volume of the tank, and a second end communicating with the internal volume of the collection pipe, and wherein the interface pipe comprises a ventilation elbow having an elbow apex positioned vertically higher than the collection pipe.

10. The tank trailer of claim 1, wherein the ventilation pipe comprises a secondary ventilation elbow having a secondary elbow apex positioned vertically higher than the collection pipe.

* * * * *